United States Patent Office 2,731,426
Patented Jan. 17, 1956

2,731,426

SULFONATED COPOLYMERS OF DICYCLOPENTA-DIENE AND MALEIC ANHYDRIDE WHICH ARE CROSS-LINKED BY SULFONE GROUPS AND HAVE CATION-ADSORBING PROPERTIES

Earl W. Lane, Philadelphia, Pa., assignor to Rohm & Haas Company, Philadelphia, Pa., a corporation of Delaware No Drawing. Application April 3, 1953,
Serial No. 346,789

2 Claims. (Cl. 260—2.2)

This invention relates to the preparation of cation-exchange resins which are insoluble in aqueous solutions of acids, bases and salts and which contain both sulfonate and carboxylate groups as their polar cation-adsorbing groups.

An object of this invention is to provide cation-exchange resins which have a high capacity for adsorbing cations and which can be very readily and economically regenerated.

This and other objects are accomplished by sulfonating a soluble, linear copolymer of dicyclopentadiene and maleic anhydride. Not only are sulfonic acid groups added to the copolymer but, at the same time, the linear chains of the copolymer become joined and cross-linked by sulfone groups,

This is surprising in view of the fact that sulfonation of a soluble compound ordinarily enhances the solubility and/or the hydrophilic character of the product.

In the preferred embodiment of this invention a linear, thermoplastic copolymer of essentially equimolar amounts of dicyclopentadiene and maleic anhydride, such as is disclosed, for example, in U. S. Patent Number 2,608,550, is reacted with sulfuric acid while dissolved in acetic anhydride. As the reaction proceeds, the product becomes increasingly insoluble and on removal of the acetic anhydride, a resin is obtained which has cation-exchange capacity and which, on being granulated, is suitable for use in conventional commercial column operation. The product is a carboxy-sulfonic cation-exchange resin which is insoluble in common organic solvents and in aqueous solutions of acids, bases and salts by virtue of having its linear molecular chains joined and cross-linked by sulfone groups,

It has been found advantageous to conduct the above process at temperatures below about 50° C.—and preferably from about 0° C. to about 25° C.—in order to obtain the optimum ratio of sulfonation and cross-linking and also to minimize decarboxylation which may take place in the presence of sulfuric acid, especially at higher temperatures.

The products of this invention can be made also by reacting a linear, thermoplastic copolymer of dicyclopentadiene and maleic anhydride with sulfur trioxide or chlorosulfonic acid while the copolymer is dissolved in an oxygenated organic solvent, such as esters, anhydrides, lower ketones, or dioxane, which solvent is inert in the accepted sense that it does not react with the sulfonating agents under the prevailing conditions. Under such conditions, higher temperatures can be used, up to about 100° C., but here, as in the preferred process described above, there is always the possibility of decarboxylation and the formation of more than enough sulfone linkages at the expense of sulfonate groups.

The following examples serve to illustrate more specifically how the products of this invention can be prepared.

Example 1

One mole each of dicyclopentadiene and maleic anhydride were dissolved in an equal weight of dioxane containing 2% by weight of benzoyl peroxide. The mixture was held at refluxing temperatures for 8 hours, after which the dioxane was stripped off under vacuum leaving a homogeneous glass-like, thermoplastic resin which was soluble in chlorinated hydrocarbons and aromatic hydrocarbons as well as in dioxane.

Into a reactor equipped with a stirrer, thermometer and ice-bath was charged 39.1 grams (0.17 mole) of the linear dicyclopentadiene-maleic anhydride copolymer prepared above and 150 grams of acetic anhydride. The solution which formed was stirred and cooled to 2° C. and to it was added, slowly over a period of 2¼ hours, twenty grams (0.20 mole) of concentrated sulfuric acid while the temperature was maintained at 5°–10° C. The reaction mixture was stirred overnight during which time it warmed up to room temperature. The excess of acetic anhydride was stripped off under vacuum and the dark, brittle, friable residue was granulated and thoroughly washed with water. The resin contained 10.1% sulfur and was in the acid form in that it contained sulfonic acid groups and carboxyl groups.

The product was tested for capacity by treatment with dilute solutions of sodium hydroxide and sodium chloride individually, and was found to have a capacity due to carboxyl groups of 6.4 milliequivalents per gram (meq./g.) or 1.34 meq./ml., a capacity due to sulfonic acid groups of 2.08 meq./g. or 0.44 meq./ml. and a wet density of 36.8 lbs./cu. ft. An outstanding property of this resin, and others made by this process, was the ease and efficiency of its regeneration. That is to say, it was easily and efficiently regenerated with equivalent amounts of acid, preferably sulfuric acid, and did not require large excesses of acid for complete regeneration as is the case with conventional cation-exchange resins containing only sulfonate groups.

Example 2

Into a reactor equipped with a stirrer, thermometer and reflux condenser was charged 46 grams (0.2 mole) of a copolymer of dicyclopentadiene and maleic anhydride prepared as above described and 100 grams of dioxane. Stirring was begun and the temperature of the resultant solution was maintained at 20°–30° C. while 25.6 grams of chlorosulfonic acid was added over a period of one hour. Stirring at 20°–30° C. was continued for a total of two hours after which the dioxane was stripped off and the solid resin was granulated and thoroughly washed with water. The product had slightly lower capacity than the product of Example 1 but was otherwise similar in that it was easily and efficiently regenerated.

I claim:

1. An insoluble cation-exchange resin which contains cation-adsorbing sulfonate groups and carboxylate groups and which is a sulfonated copolymer of dicyclopentadiene and maleic anhydride in which the linear chains of said copolymer are joined and cross-linked by sulfone groups,

2. A process for preparing a cation-exchange resin which contains cation-adsorbing sulfonate groups and carboxylate groups which comprises reacting, with sulfuric acid at a temperature from about 0° C. to about 50° C., a linear copolymer of dicyclopentadiene and maleic anhydride which is dissolved in acetic anhydride, whereby said copolymer is sulfonated and the linear chains of said copolymer are joined and cross-linked by sulfone groups,
References Cited in the file of this patent
UNITED STATES PATENTS
| | | |
|---|---|---|
| 2,366,007 | D'Alelio | Dec. 26, 1944 |
| 2,469,472 | Nachod et al. | May 10, 1949 |
| 2,608,550 | Rowland at al. | Aug. 26, 1952 |
OTHER REFERENCES
Topp: Jour. Chem. Society, December 1949, pages 3299–3303.